(12) United States Patent
Mastronardi et al.

(10) Patent No.: US 11,597,452 B2
(45) Date of Patent: Mar. 7, 2023

(54) CONTROL STATION FOR COMPACT VEHICLES

(71) Applicant: JLG INDUSTRIES, INC., McConnellsburg, PA (US)

(72) Inventors: Shane J. Mastronardi, Hagerstown, MD (US); Ignacy Puszkiewicz, Hagerstown, MD (US); Zeno Poltronieri, Verona (IT); Roberto Marchesini, Verona (IT); Matteo Lavagnini, Verona (IT)

(73) Assignee: JLG INDUSTRIES, INC., McConnellsburg, PA (US)

( * ) Notice: Subject to any disclaimer, the term of this patent is extended or adjusted under 35 U.S.C. 154(b) by 393 days.

(21) Appl. No.: 16/839,396

(22) Filed: Apr. 3, 2020

(65) Prior Publication Data

US 2020/0317279 A1    Oct. 8, 2020

Related U.S. Application Data

(60) Provisional application No. 62/829,123, filed on Apr. 4, 2019.

(51) Int. Cl.
| | |
|---|---|
| *B62D 51/00* | (2006.01) |
| *B60K 26/00* | (2006.01) |
| *B62D 51/02* | (2006.01) |
| *B66F 11/04* | (2006.01) |
| *B60K 26/02* | (2006.01) |

(52) U.S. Cl.
CPC ............ *B62D 51/001* (2013.01); *B60K 26/00* (2013.01); *B62D 51/007* (2013.01); *B62D 51/02* (2013.01); *B66F 11/04* (2013.01); *B60K 2026/029* (2013.01)

(58) Field of Classification Search
CPC .... B62D 51/001; B62D 51/007; B62D 51/02; B66F 11/04; B66F 9/20; B66F 9/0759; B60K 2026/029; G05G 5/005; G05G 9/047; G05G 1/01; E02F 9/2004
See application file for complete search history.

(56) References Cited

U.S. PATENT DOCUMENTS

| | | |
|---|---|---|
| 4,275,800 A | 6/1981 | Batzel |
| 4,436,177 A | 3/1984 | Elliston |
| (Continued) | | |

FOREIGN PATENT DOCUMENTS

| | | |
|---|---|---|
| CN | 107074514 A | 8/2017 |
| CN | 207096943 U | 3/2018 |
| (Continued) | | |

OTHER PUBLICATIONS

International Search Report dated Aug. 11, 2020 issued in PCT International Patent Application No. PCT/US2020/026559, 6 pp.
(Continued)

*Primary Examiner* — Marthe Y Marc-Coleman
(74) *Attorney, Agent, or Firm* — Nixon & Vanderhye P.C.

(57) ABSTRACT

A vehicle control station includes a hand rest and at least one micro-joystick positioned relative to the hand rest such that the hand rest is configured to locate an operator's hand and fingers in position to operate the at least one micro-joystick. A function enable switch is configured to activate the at least one micro-joystick.

17 Claims, 13 Drawing Sheets

(56) References Cited

U.S. PATENT DOCUMENTS

| | | | |
|---|---|---|---|
| 4,702,520 A * | 10/1987 | Whisler | B60N 2/77 |
| | | | 297/115 |
| 4,730,691 A | 3/1988 | Grigg | |
| 5,086,869 A | 2/1992 | Newbery et al. | |
| 6,249,725 B1 | 6/2001 | Dziedzioch et al. | |
| 6,643,577 B1 * | 11/2003 | Padgett | E02F 9/2012 |
| | | | 318/568.18 |
| 6,971,194 B2 | 12/2005 | McClelland et al. | |
| 7,032,703 B2 | 4/2006 | Wulfert et al. | |
| 7,188,991 B1 | 3/2007 | Weiler | |
| 7,484,587 B2 | 2/2009 | Portscheller et al. | |
| 7,641,021 B2 | 1/2010 | Behncke et al. | |
| 8,398,023 B2 | 3/2013 | N nez et al. | |
| 8,478,455 B2 | 7/2013 | Orsulak et al. | |
| 9,701,023 B2 | 7/2017 | Zhang et al. | |
| 10,124,999 B2 | 11/2018 | Puszkiewicz et al. | |
| 10,126,733 B2 | 11/2018 | Suzuki et al. | |
| 10,262,465 B2 | 4/2019 | Wright et al. | |
| 10,488,862 B2 | 11/2019 | Buburuzan et al. | |
| 10,583,923 B2 | 3/2020 | Alves et al. | |
| 2008/0255704 A1 * | 10/2008 | Braut | H01H 3/0253 |
| | | | 901/42 |

FOREIGN PATENT DOCUMENTS

| | | | |
|---|---|---|---|
| DE | 10 2004 052 757 | 5/2006 | |
| DE | 102004052757 A1 * | 5/2006 | B66F 9/20 |
| EP | 3 440 526 | 2/2019 | |
| FR | 3 008 503 | 1/2015 | |
| FR | 3008503 A1 * | 1/2015 | G05G 5/005 |
| KR | 10-1415499 | 7/2014 | |
| KR | 101415499 B1 * | 7/2014 | E02F 9/26 |
| WO | WO-2017177113 A1 * | 10/2017 | B66F 11/04 |

OTHER PUBLICATIONS

Chinese Office Action dated Nov. 10, 2022 issued in Chinese Patent Application No. 202080027188.2, 8 pp.

* cited by examiner

CONTROL STATION FOR COMPACT VEHICLES

CROSS-REFERENCES TO RELATED APPLICATIONS

This application claims the benefit of U.S. Provisional Patent Application No. 62/829,123, filed Apr. 4, 2019, the entire content of which is herein incorporated by reference.

STATEMENT REGARDING FEDERALLY SPONSORED RESEARCH OR DEVELOPMENT (Not Applicable)

BACKGROUND

The invention relates to compact vehicles and, more particularly, to a control station that is particularly suited for stand-on tracked vehicles like dumpers, crawler work platforms (booms and scissors) as well as wheeled work platforms and other types of compact tracked and wheeled vehicles.

Existing track type machines or crawler machines with a stand-on control station typically use one of two approaches to control station design. With a single two-axis proportional joystick, the left and right vehicle tracks are driven proportionally based on a position of the single joystick. For example, pushing the joystick straight forward provides for equal drive to the left and right tracks, whereas pushing the joystick forward and 45° to the right, for example, would drive the left track slightly faster than the right track, causing the vehicle to initiate a right turn. The second approach utilizes two single-axis joysticks that are typically positioned close together. Each of the two single-axis joysticks independently controls one of the left and right tracks. Thus, for example, pushing the left joystick forward would drive the left track and initiate a right turn.

SUMMARY

The control station of the described embodiments provides improved control by incorporating a hand rest (grab), which allows the operator to stabilize his/her hand and control both tracks or wheel sets with one hand. Each track (crawler) assembly is controlled by a separate, proportional micro-joystick (controller); alternatively, left side wheels and right side wheels may be controlled independently (front only, back only, or both front and back) with each micro-joystick. A function enable switch may be incorporated into the hand rest assembly. The assembly can be attached or integrated into the control station. The joysticks may be provided with integrated color lights, and those colors can be coordinated with decals explaining operation of the control. The control station may also include both left and right side hand rests incorporating additional controls for the operator's opposite hand.

In an exemplary embodiment, a vehicle control station includes a first hand rest and at least one first micro-joystick positioned relative to the first hand rest such that the first hand rest is configured to locate an operator's hand and fingers in position to operate the at least one first micro-joystick. A first function enable switch is configured to activate the at least one first micro-joystick.

The first function enable switch may include a contact-less sensor, such as a capacitance sensor. The switch may be incorporated into the hand rest. In some embodiments, the first hand rest includes a framework, and the contact-less sensor may be supported via the framework. The first function enable switch may alternatively be positioned relative to the first hand rest for operation by one of the operator's fingers different from those positioned to operate the at least one first micro-joystick, e.g., the operator's thumb.

The control station may include two first micro-joysticks positioned for operation by one hand. In this context, the first function enable switch may be positioned for operation by the one hand. The first hand rest may include a finger guard positioned between the two first micro-joysticks.

In some embodiments, the vehicle control station is configured for an application to a tracked vehicle including a left track and a right track, where the two first micro-joysticks are configured for independent operation of the left and right tracks, respectively.

The vehicle control station may additionally include a second hand rest and at least one second micro-joystick positioned relative to the second hand rest such that the second hand rest is configured to locate an operator's opposite hand and fingers in position to operate the at least one second micro-joystick. A second function enable switch is configured to activate the at least one second micro-joystick. A secondary switch may be positioned relative to the hand rest for operation by the operator's opposite hand, which may include one of an additional second micro-joystick, a press button, a two-position switch, and a single-axis micro-joystick.

In some embodiments, the vehicle control station is configured for an application to an aerial work platform including a platform supported on a boom or scissor mechanism, where the at least one first micro-joystick may be configured for vehicle drive, and the at least one second micro-joystick may be configured for manipulating the platform.

The at least one first micro-joystick may be positioned relative to the first hand rest such that a horizontal distance (A) from a forward edge of the first hand rest to a forward edge of the first micro-joystick is 0.0-0.65", a vertical distance (B) from a top of the first hand rest to a center of the first micro-joystick is 1.50-2.25", an orientation angle (C) of the first micro-joystick relative to horizontal is 5-10☐, a vertical distance (D) from the forward edge of the first hand rest to the first micro-joystick is 0.30-0.75", and a linear distance (E) from the first hand rest to a distal edge of the first micro-joystick is 0.30-1.30".

In another exemplary embodiment, a vehicle control station includes a left side hand rest, a right side hand rest, a pair of first micro-joysticks cooperable with one of the left and right side hand rests, and at least one second micro-joystick cooperable with the other of the left and right side hand rests. The one of the left and right side hand rests is configured to enable an operator to operate the pair of first micro-joysticks with one hand. The other of the left and right side hand rests is configured to enable the operator to operate the at least one second micro-joystick with an opposite hand. First and second function enable switches are incorporated into each of the left and right side hand rests, respectively. The first and second function enable switches are configured to activate the pair of first micro-joysticks and the at least one second micro-joystick, respectively.

BRIEF DESCRIPTION OF THE DRAWINGS

These and other aspects and advantages will be described in detail with reference to the accompanying drawings, in which.

DETAILED DESCRIPTION

Figure 1:
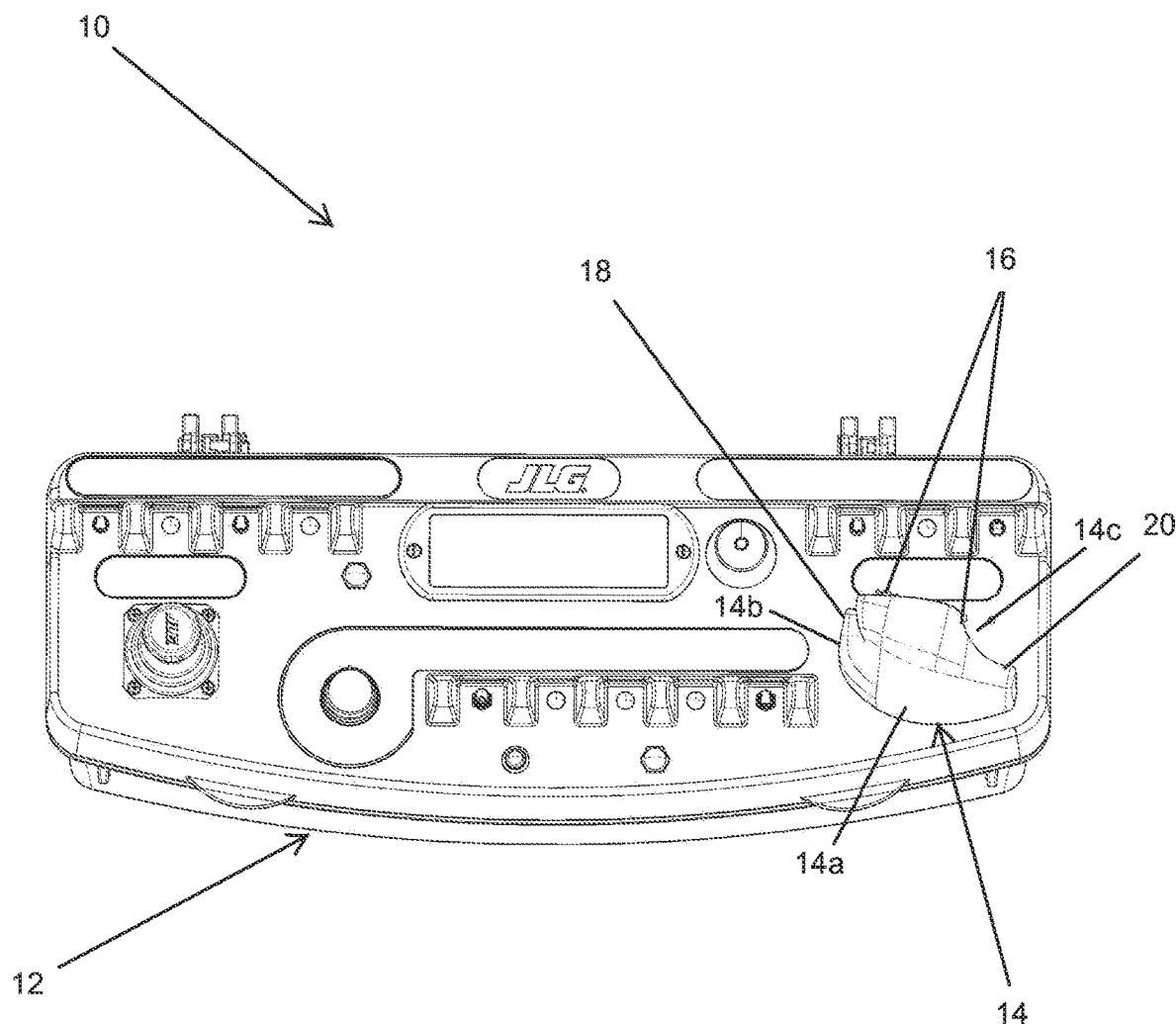
FIG. 1 shows a bolt-on version of a control station attached in place of a typical two-axis joystick.
Figure 3:
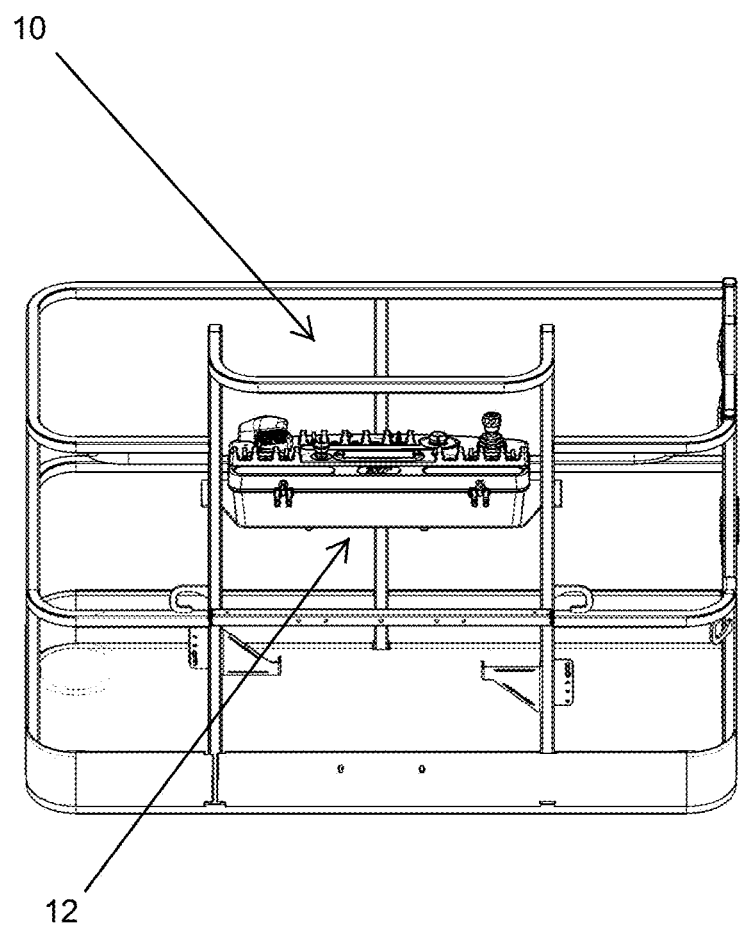
FIG. 3 shows a platform including an exemplary control station of the described embodiments.

FIG. 1 shows an exemplary bolt-on control accessory or hand rest assembly 10 attached to a machine control box 12. FIG. 3 shows the assembly 10 secured on a work platform. The hand rest assembly 10 replaces the typical single two-axis proportional joystick or the typical two single-axis joysticks for separately controlling the vehicle tracks. The control accessory 10 includes a hand rest 14 that serves to locate an operator's hand and fingers in position to operate separate proportional micro-joysticks 16. The hand rest 14 includes a forward surface 14a, a side surface 14b, and a back surface 14c. A function enable switch 18 is incorporated into the hand rest assembly 10 and is positioned for activation by the operator's thumb (for example, positioned on the side surface 14b). The function enable switch may alternatively be a contact-less sensor, such as a capacitance sensor. The hand rest assembly 10 may also include a flange 20 or the like to support and contain an outside portion of the operator's hand.

Figure 2:
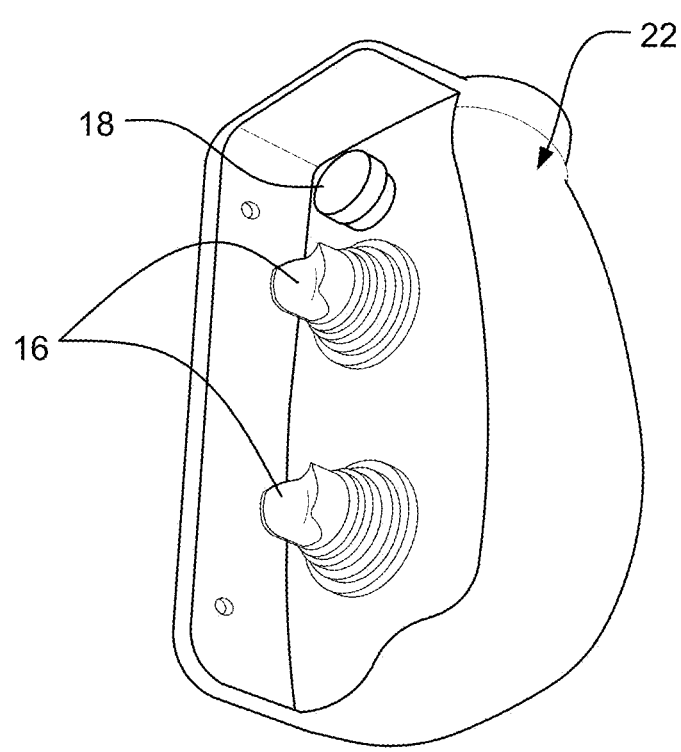
FIG. 2 shows an exemplary configuration of a control housing securable to the operator console.

FIG. 2 shows a variation including a housing 22 that may be bolted to the operator console. The housing 22 defines a hand rest and includes the micro-joystick controllers 16 and function enable switch 18. The operator can drive the machine with a single hand by manipulating the joysticks 16 with his/her fingers. In an exemplary application, pushing the joysticks 16 forward and down drive each respective track forward, whereas pulling the joysticks 16 aft and slightly up drive the respective tracks in reverse. The tracks are independently controlled with each of the joysticks 16. FIG. 3 shows a platform including an exemplary control station.

Figure 4:
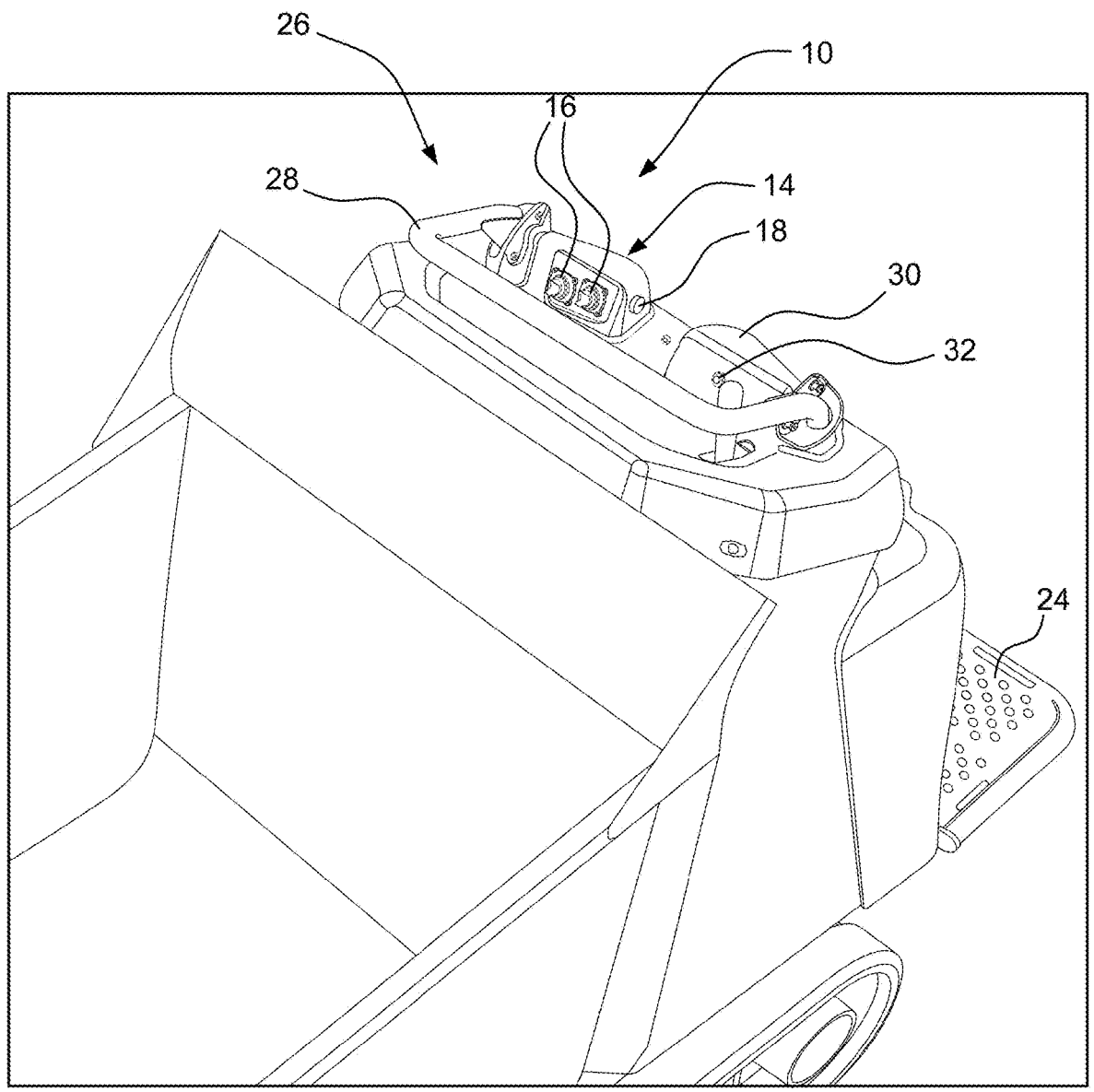
FIG. 4 shows an exemplary application on a stand-on tracked dumper vehicle.
Figure 5:
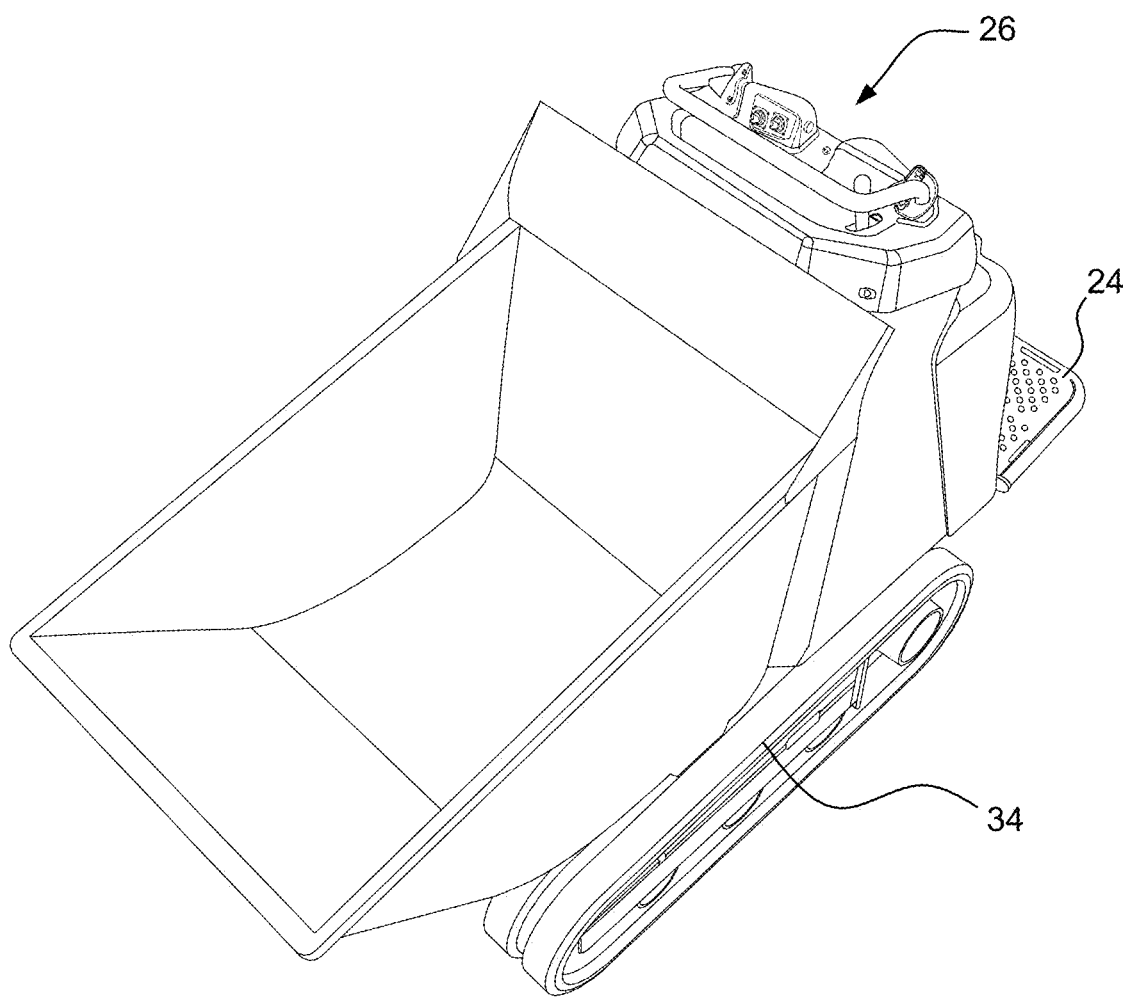
FIGS. 5 and 6 show alternative views of the exemplary tracked dumper vehicle.
Figure 6:
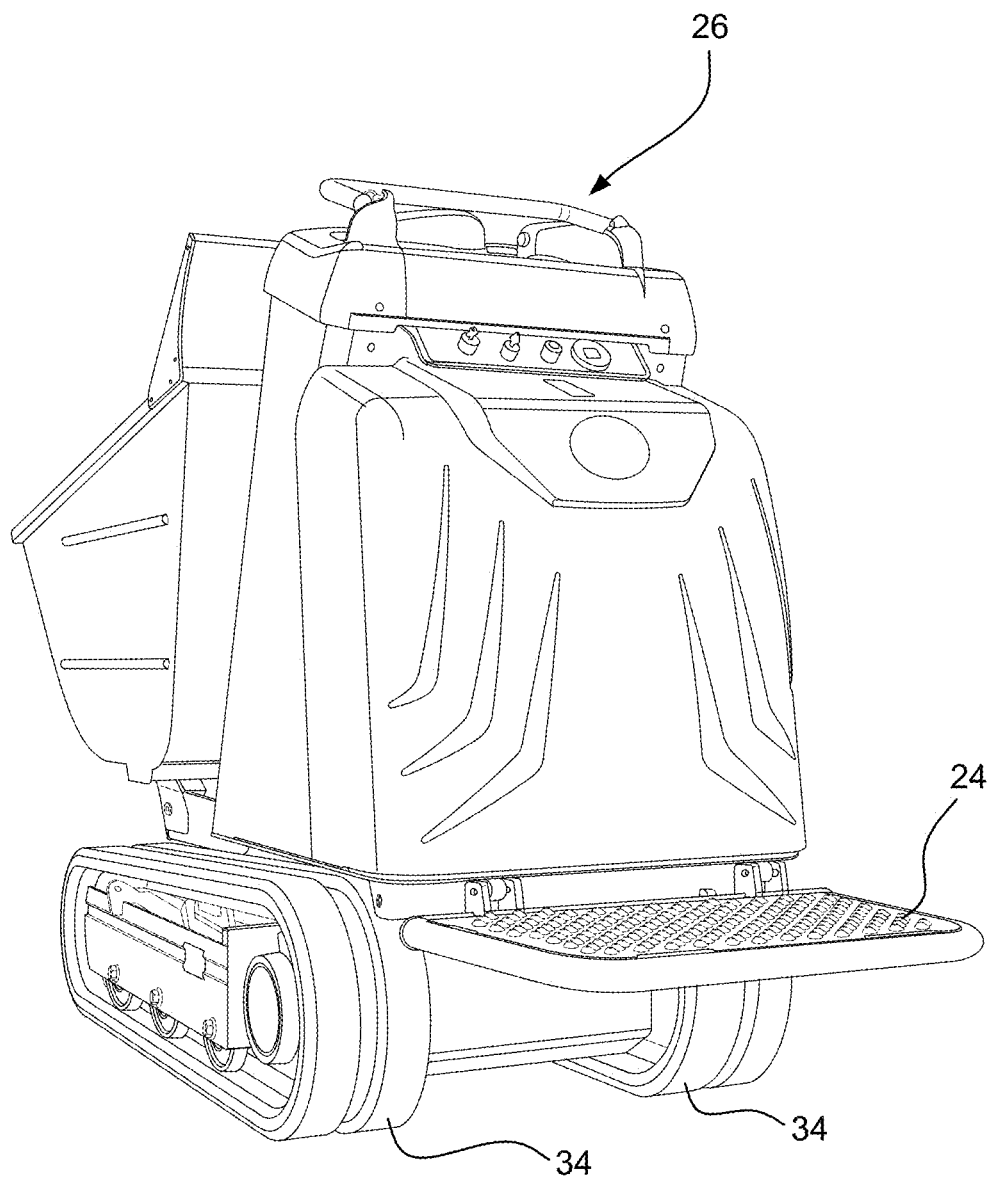

FIGS. 4-6 show an exemplary stand-on tracked dumper incorporating the hand rest assembly 10 of the described embodiments. The dumper vehicle includes an operator platform 24 and a control panel area 26 including the hand rest assembly 10. A safety bar 28 helps to prevent inadvertent operation of the control implements. The joysticks 16 and function enable switch 18 are positioned for manipulation by an operator's right hand. A matching hand rest 30 for the operator's left hand may incorporate controls for other functions. A single control switch 32 on the matching hand rest 30 is shown in FIG. 4. An exemplary control may be, for example, horn control. FIGS. 5 and 6 show the independent tracks 34 that drive the vehicle. In a variation, the function enable switch 18 may be associated with the opposite hand control (instead of or in addition to the horn control) or alternatively via a conventional foot-switch. Systems for driving the tracks 34 independently by operation of the micro-joysticks 16 are known, and details will not be further described.

Figure 7:
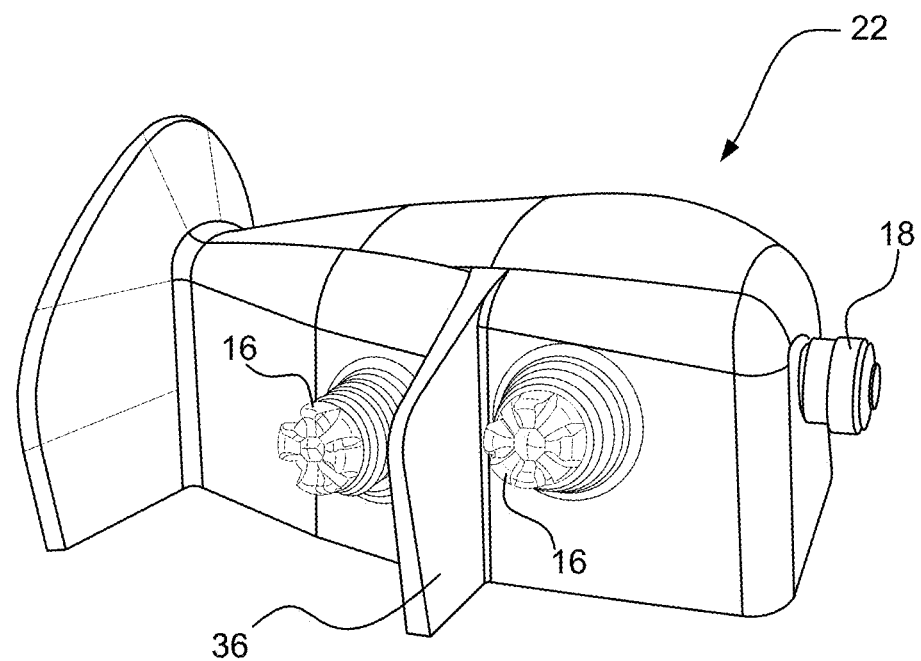
FIGS. 7 and 8 show the control housing including a divider or finger guard.
Figure 8:
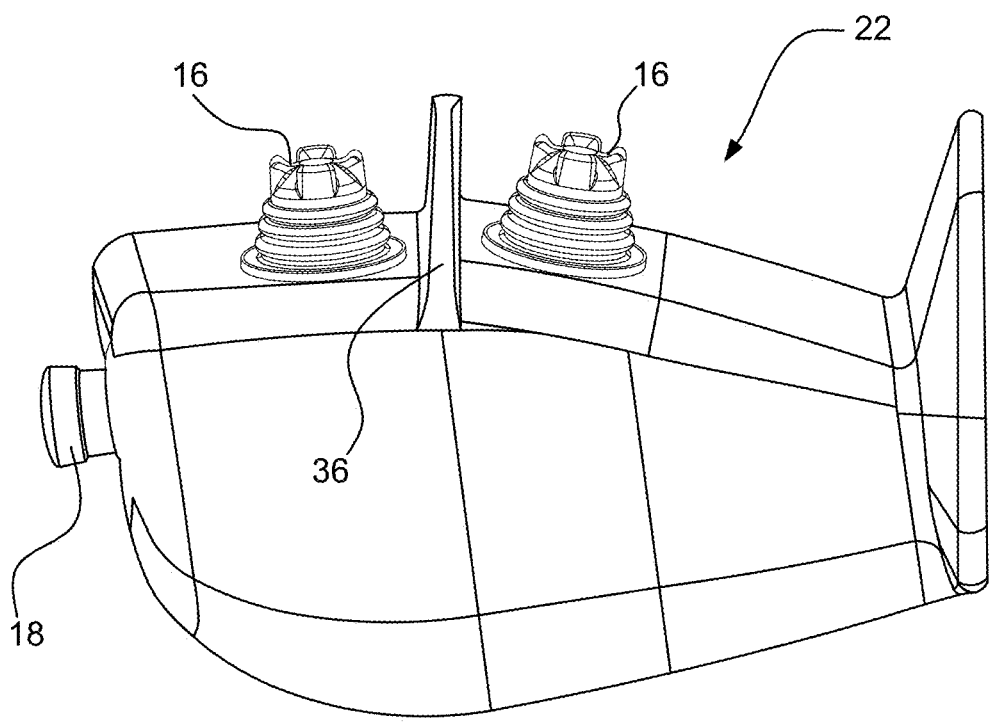

FIGS. 7 and 8 show a variation of the housing 22 including a divider or finger guard 36 that separates the micro-joysticks 16. The divider 36 helps to reduce or eliminates the possibility of accidental, unintended activation of the closely spaced micro-joysticks 16. The enable switch 18 is positioned for operation by the operator's thumb.

Figure 9:
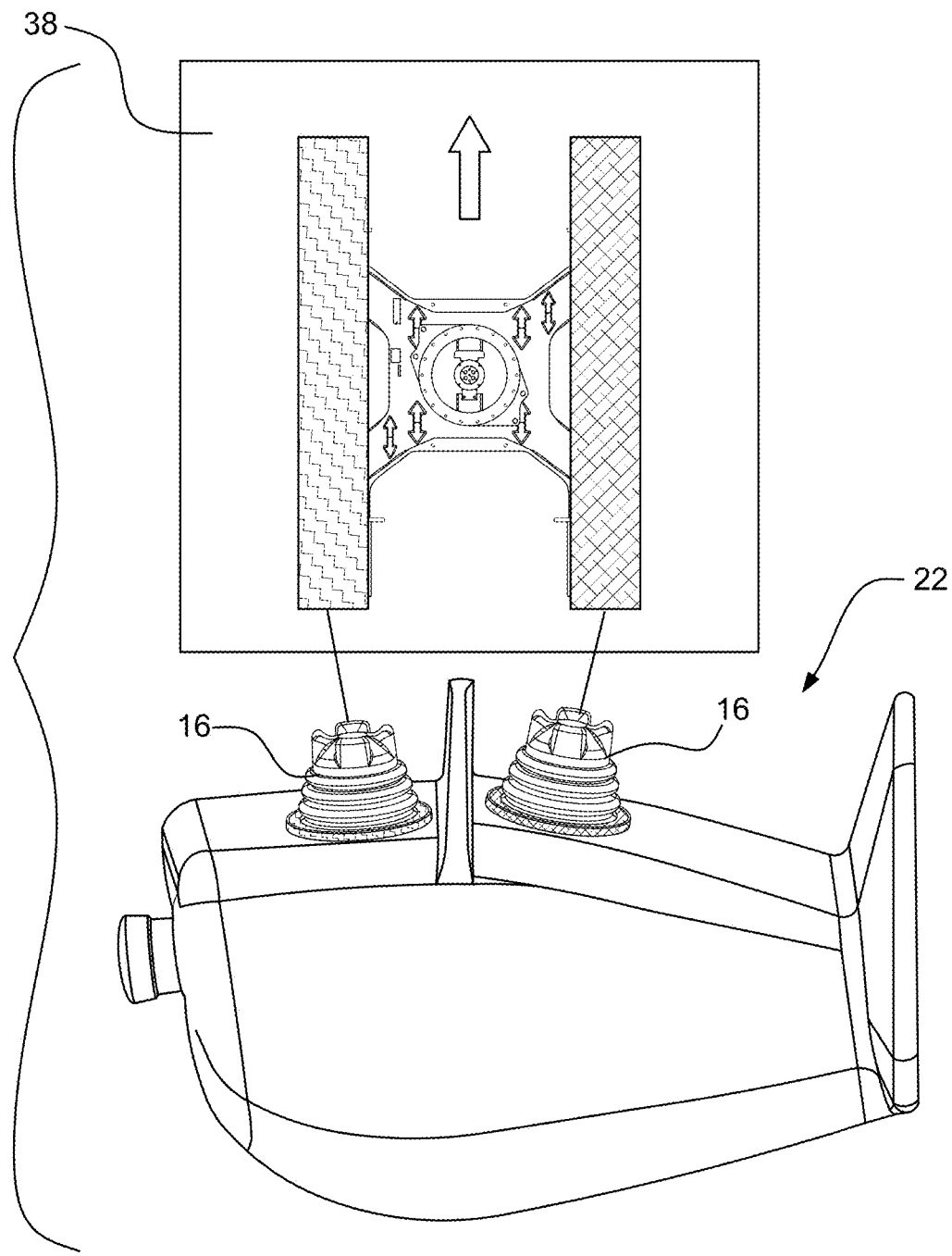
FIG. 9 shows an LED light built into the micro-joystick and a decal explaining operation.

FIG. 9 shows color coordination between an LED light built into the micro-joysticks 16 and a decal 38 explaining operation of the controller.

Figure 10:
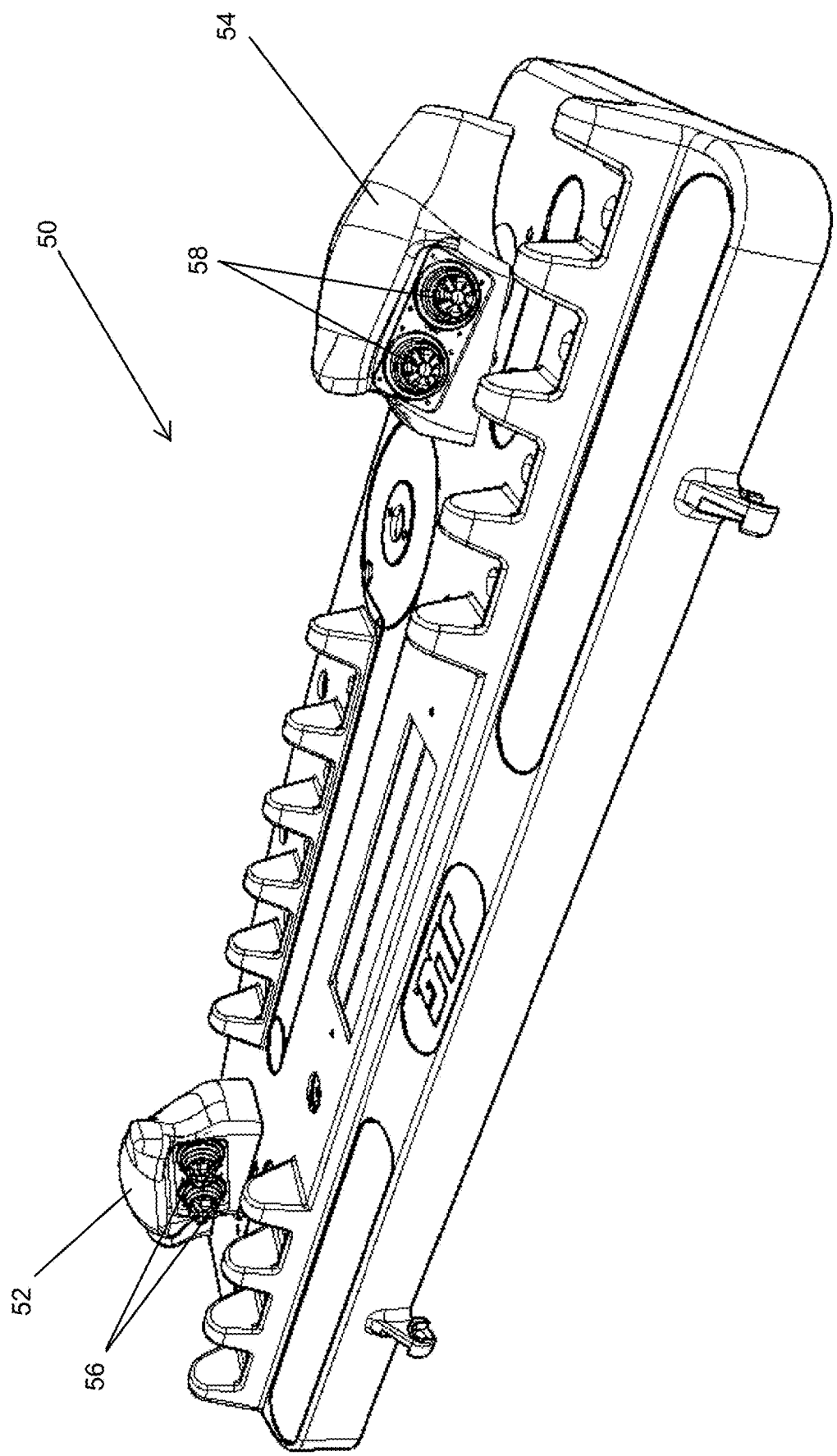
FIG. 10 shows an exemplary control station of an alternative embodiment incorporating left and right side hand rests with micro-joystick-controllers.
Figure 11:
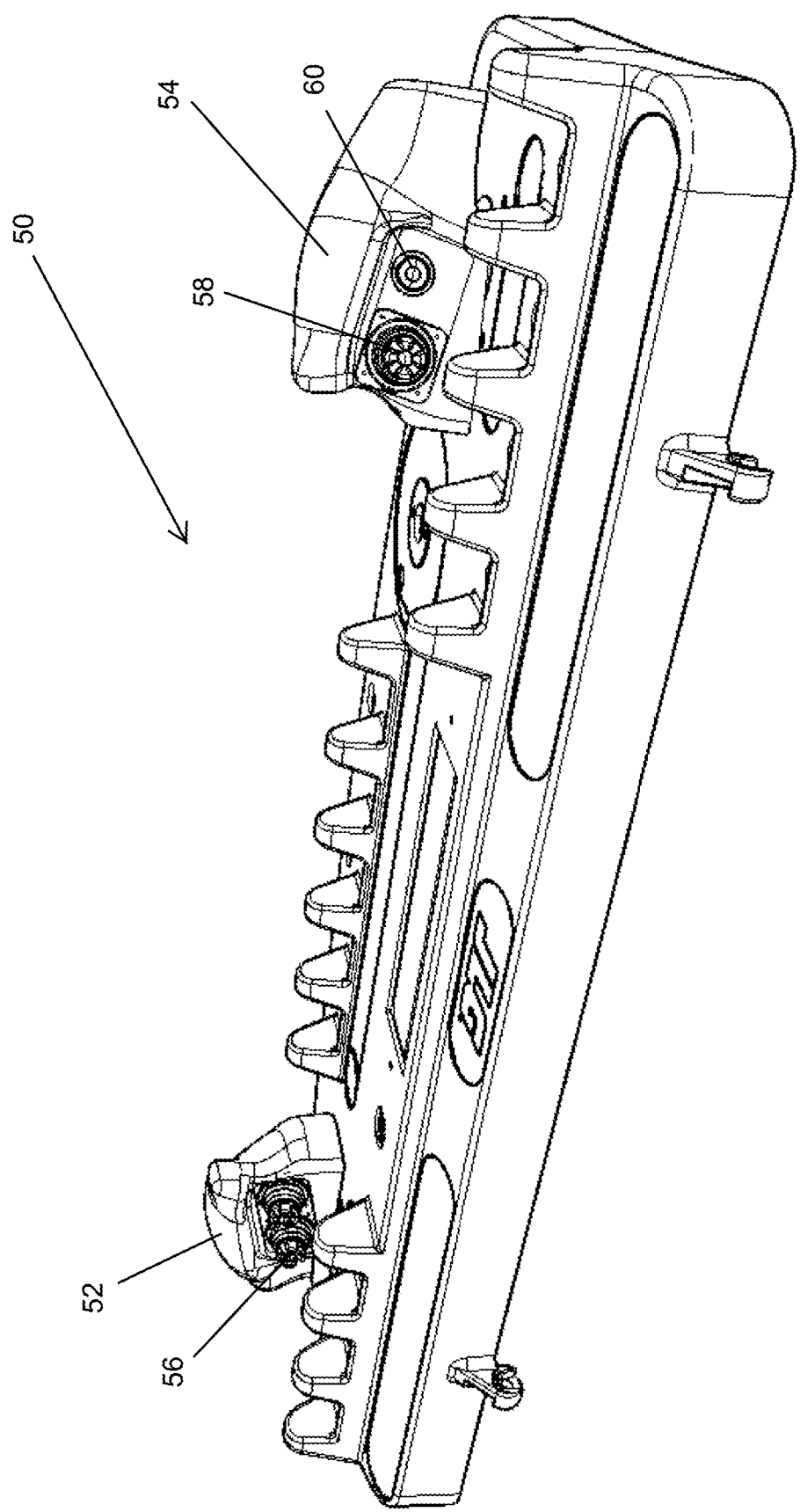
FIG. 11 shows a variation of the FIG. 10 embodiment.
Figure 12:
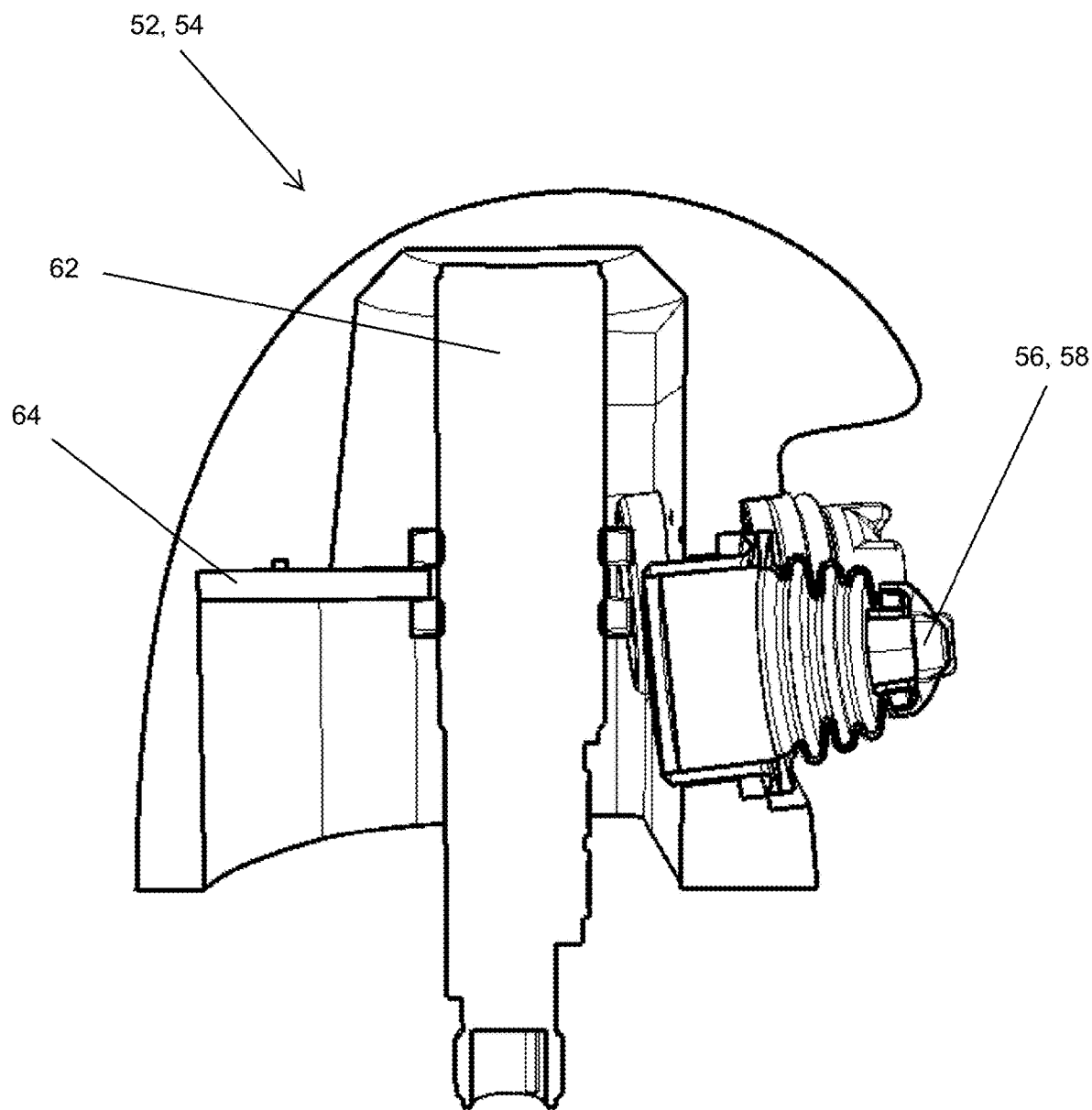
FIG. 12 is a cross-sectional view through the hand rest and micro-joystick assembly.

FIGS. 10-12 show an alternative configuration for a vehicle control station 50. Like the first embodiment, the vehicle control station 50 is cooperable with a machine control box for controlling machine function and operation.

The control station 50 includes a first or right side hand rest 52 and a second or left side hand rest 54. The hand rests 52, 54 may also be switched. The right side hand rest 52 shown in FIG. 10 includes a pair of first micro-joysticks 56. The hand rest 52 is configured to enable an operator to operate the pair of first micro-joysticks 56 with one hand.

The left side hand rest 54 shown in FIG. 10 includes a pair of second micro-joysticks 58, and the hand rest 54 is configured to enable the operator to operate the second micro-joysticks 58 with an opposite hand.

In FIG. 11, one of the second micro-joysticks 58 is replaced with an alternative switch 60 such as a press button, a two-position switch or the like. In an exemplary construction, where the right side hand rest 52 and first micro-joysticks 56 are intended for vehicle drive, the left side hand rest 54 and second micro-joysticks 58 and/or switch 60 are provided for alternative functions. Exemplary functions may include platform manipulation with an application to an aerial work platform that includes a platform supported on a boom or scissor mechanism. The switch 60 may be functional for horn operation, or as a two-position switch or single-axis micro-joystick for telescope in/out, etc.

FIG. 12 is a cross-sectional view through the hand rests 52, 54 and micro-joysticks 56, 58. Each of the hand rests 52, 54 includes a function enable switch 62 that is configured to activate the micro-joysticks 56, 58 and/or switch 60 in use. The function enable switches 62 may be in the form of a physical switch as shown in the first embodiment positioned for operation by an operator's thumb. Alternatively, the function enable switches may be contact-less sensors such as a capacitance sensor or the like. In the exemplary embodiment shown in FIG. 12, a contact-less sensor 62 is embedded within the hand rests 52, 54 and supported via a framework 64. Any suitable contact-less sensor could be used, and there are several known sensors of this type.

Figure 13:
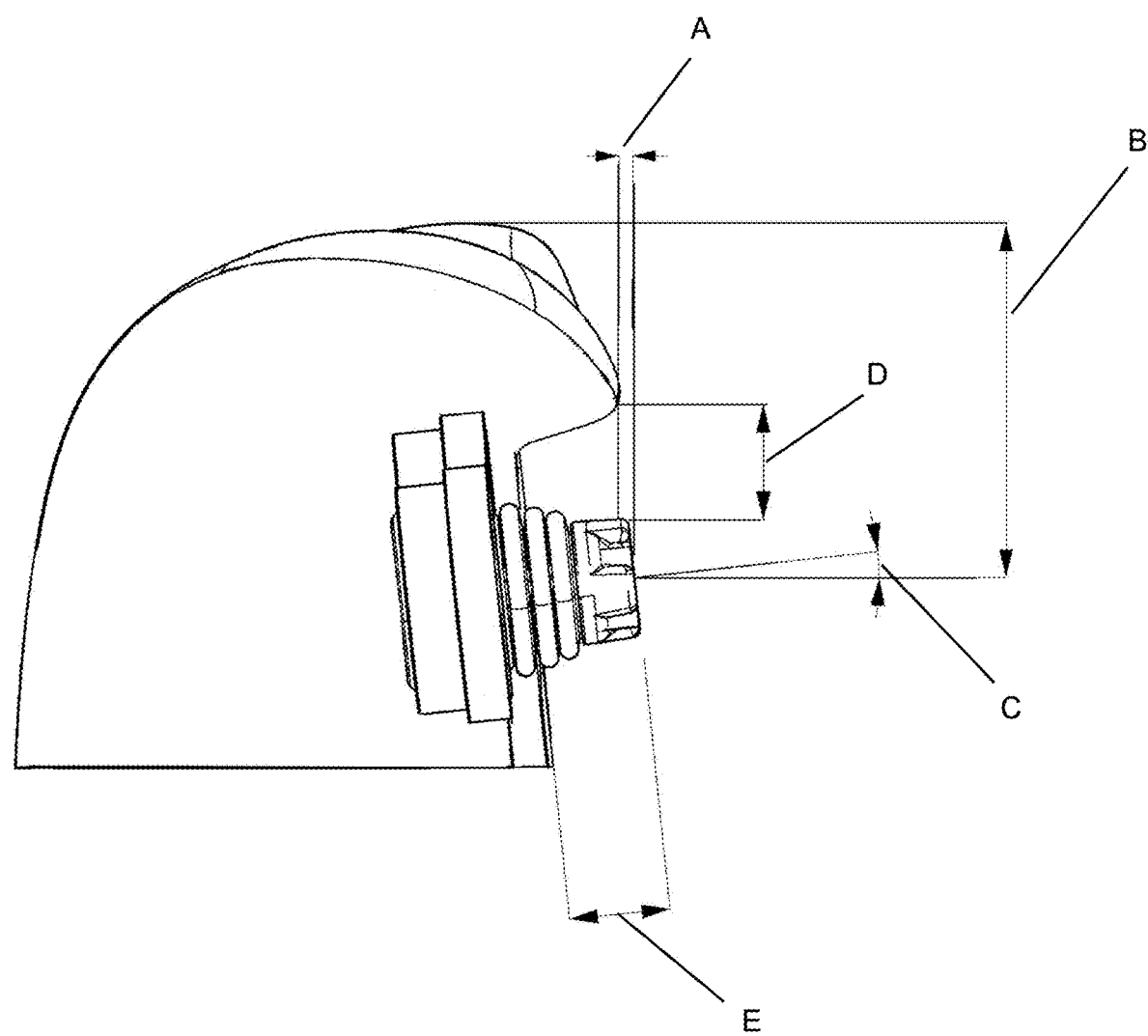
FIG. 13 is a cross-sectional view through the hand rest showing exemplary relationships between the hand grip and the position and orientation of the mini-joystick.

FIG. 13 illustrates ergonomic dimensions that result in a proper relationship between the hand grip and the position and orientation of the mini-joystick. The dimensions are the result of research and investigation to assure comfortable ergonomic operation. Any or all of the hand grips as shown and described may be configured for comfortable ergonomic operation. For example, with reference to FIG. 13, the micro-joystick(s) may be positioned relative to the hand rests such that a horizontal distance (A) from a forward edge of the hand rest to a forward edge of the micro-joystick is 0.0-0.65", a vertical distance (B) from a top of the hand rest to a center of the micro-joystick is 1.50-2.25", an orientation angle (C) of the micro-joystick relative to horizontal is 5-10□, a vertical distance (D) from the forward edge of the hand rest to the micro-joystick is 0.30-0.75", and a linear distance (E) from the hand rest to a distal edge of the micro-joystick (i.e., a "height" of the micro-joystick) is 0.30-1.30".

Figure 14:
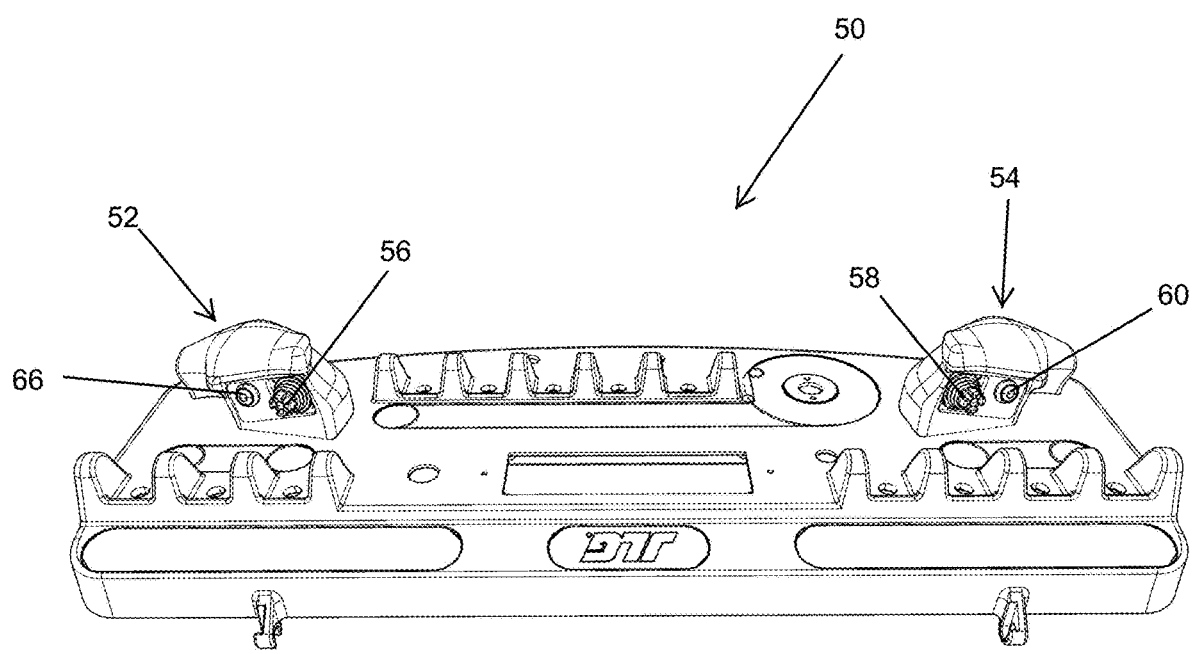
FIG. 14 shows an exemplary control station of an alternative embodiment suited for controlling a wheeled machine.

FIG. 14 illustrates the control station 50 further modified for control of a wheeled machine. In FIG. 14, the right side hand rest 52 includes a dual axis micro-joystick 56 and an alternative switch 66 such as a press button, a two-position switch or a single-axis micro-joystick. Similarly, the left side hand rest 54 includes a dual axis micro-joystick 58 and an alternative switch 60. In an exemplary application, one of the dual axis micro-joysticks 56, 58 can be used to control drive speed and direction with UP/DOWN displacement and steer with LEFT/RIGHT displacement.

The hand rest assembly 10, the housing 22 and hand rests 52, 54 are applicable and interchangeable with one another as each variation and feature may be included any of the other components. For example, the hand rest assembly 10 and the hand rests 52, 54 may be provided with the divider 36 shown with the housing 22.

The control station of the described embodiments provides an innovative approach to control vehicle drive and functionality, while allowing the operator to maintain stability while controlling driving function with a single hand. The function enable switches serve to prevent inadvertent operation. The control station is particularly applicable to tracked vehicles, crawler work platforms (booms and scissors) and other types of compact vehicles. The system is also applicable to control wheeled machines with stand-on operation stations, particularly work platforms (booms and scissors).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A vehicle control station comprising:
   a first hand rest including a forward surface, a side surface, and a back surface;
   at least one first micro-joystick positioned on the forward surface and relative to the first hand rest such that the first hand rest is configured to locate an operator's hand and fingers in position to operate the at least one first micro-joystick; and
   a first function enable switch positioned on the side surface and configured to activate the at least one first micro-joystick.

2. A vehicle control station according to claim 1, wherein the first function enable switch is incorporated into the first hand rest.

3. A vehicle control station according to claim 2, wherein the first function enable switch comprises a contact-less sensor.

4. A vehicle control station according to claim 3, wherein the first function enable switch comprises a capacitance sensor.

5. A vehicle control station according to claim 3, wherein the first hand rest comprises a framework, and wherein the contact-less sensor is supported via the framework.

6. A vehicle control station according to claim 1, comprising two first micro-joysticks positioned for operation by one hand.

7. A vehicle control station according to claim 6, wherein the first function enable switch is positioned for operation by the one hand.

8. A vehicle control station according to claim 6, configured for an application to a tracked vehicle including a left track and a right track, wherein the two first micro-joysticks are configured for independent operation of the left and right tracks, respectively.

9. A vehicle control station according to claim 1, further comprising:
   a second hand rest;
   at least one second micro-joystick positioned relative to the second hand rest such that the second hand rest is configured to locate an operator's opposite hand and fingers in position to operate the at least one second micro-joystick; and
   a second function enable switch configured to activate the at least one second micro-joystick.

10. A vehicle control station according to claim 9, wherein the second function enable switch is incorporated into the second hand rest.

11. A vehicle control station according to claim 9, further comprising a secondary switch positioned relative to the hand rest for operation by the operator's opposite hand.

12. A vehicle control station according to claim 11, wherein the secondary switch comprises one of an additional second micro-joystick, a press button, a two-position switch, and a single-axis micro-joystick.

13. A vehicle control station according to claim 9, configured for an application to an aerial work platform including a platform supported on a boom or scissor mechanism, wherein the at least one first micro-joystick is configured for vehicle drive, and the at least one second micro-joystick is configured for manipulating the platform.

14. A vehicle control station according to claim 1, wherein the at least one first micro-joystick is positioned relative to the first hand rest such that a horizontal distance (A) from a forward edge of the first hand rest to a forward edge of the first micro-joystick is 0.0-0.65", wherein a vertical distance (B) from a top of the first hand rest to a center of the first micro-joystick is 1.50-2.25", wherein an orientation angle (C) of the first micro-joystick relative to horizontal is 5-10°, wherein a vertical distance (D) from the forward edge of the first hand rest to the first micro-joystick is 0.30-0.75", and wherein a linear distance (E) from the first hand rest to a distal edge of the first micro-joystick is 0.30-1.30".

15. A vehicle control station comprising:
    a first hand rest;
    at least one first micro-joystick positioned relative to the first hand rest such that the first hand rest is configured to locate an operator's hand and fingers in position to operate the at least one first micro-joystick; and
    a first function enable switch configured to activate the at least one first micro-joystick, wherein the first function enable switch is positioned relative to the first hand rest for operation by one of the operator's fingers different from those positioned to operate the at least one first micro-joystick.

16. A vehicle control station according to claim 15, wherein the first function enable switch is positioned relative to the first hand rest for operation by a thumb of the operator.

17. A vehicle control station comprising:
a first hand rest;
two first micro-joysticks positioned relative to the first hand rest such that the first hand rest is configured to locate an operator's hand and fingers in position to operate the two first micro-joysticks; and
a function enable switch configured to activate the two first micro-joysticks,
wherein the first hand rest comprises a finger guard positioned between the two first micro-joysticks.

* * * * *